(12) United States Patent
Bieber

(10) Patent No.: US 12,270,959 B2
(45) Date of Patent: Apr. 8, 2025

(54) ULTRAHIGH SURFACE AREA MATERIALS AND METHODS OF MAKING THE SAME

(71) Applicant: UNIVERSITY OF SOUTH FLORIDA, Tampa, FL (US)

(72) Inventor: Jay A. Bieber, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 271 days.

(21) Appl. No.: 17/887,689

(22) Filed: Aug. 15, 2022

(65) Prior Publication Data

US 2022/0390629 A1 Dec. 8, 2022

Related U.S. Application Data

(63) Continuation of application No. 16/175,736, filed on Oct. 30, 2018, now Pat. No. 11,480,696.

(60) Provisional application No. 62/578,881, filed on Oct. 30, 2017.

(51) Int. Cl.
| | |
|---|---|
| *G01N 23/2273* | (2018.01) |
| *B23K 26/06* | (2014.01) |
| *B23K 26/0622* | (2014.01) |
| *B23K 26/073* | (2006.01) |
| *B23K 26/352* | (2014.01) |
| *B23K 26/359* | (2014.01) |
| *G01T 1/36* | (2006.01) |

(52) U.S. Cl.
CPC ............ *G01T 1/36* (2013.01); *B23K 26/0624* (2015.10); *B23K 26/0626* (2013.01); *B23K 26/073* (2013.01); *B23K 26/355* (2018.08); *B23K 26/359* (2015.10); *G01N 23/2273* (2013.01)

(58) Field of Classification Search
CPC .. G01T 1/36; B23K 26/0624; B23K 26/0626; B23K 26/073; B23K 26/355; B23K 26/359; G01N 23/2273; H01J 49/482
USPC ......................................................... 250/310
See application file for complete search history.

(56) References Cited

U.S. PATENT DOCUMENTS

| | | | |
|---|---|---|---|
| 10,876,193 B2 | 12/2020 | Guo et al. | |
| 2003/0157254 A1 | 8/2003 | Mirkin et al. | |
| 2009/0243584 A1 | 10/2009 | Zhang et al. | |
| 2010/0066346 A1 | 3/2010 | Zhang et al. | |
| 2014/0011013 A1* | 1/2014 | Jin ......................... | B05D 5/00 438/57 |

(Continued)

OTHER PUBLICATIONS

Bakush, T.A. El and M.M. El Gomati, "Internal scattering in a single pass cylindrical mirror analyses", Journal of Electron Spectroscopy and Related Phenomena, 1995, pp. 109-120, vol. 74, doi: 10.1016/0368-2048(95)02362-3.

(Continued)

*Primary Examiner* — Kiet T Nguyen
(74) *Attorney, Agent, or Firm* — Quarles & Brady LLP; Yakov Sidorin

(57) ABSTRACT

In one embodiment, a surface has a laser-beam machined area including an array of micro-sized conical pillars that are arranged in orthogonal rows and columns across the surface and that extend upward, the conical pillars defining deep troughs between them that are configured to absorb electrons, electromagnetic radiation, or both, the conical pillars tapering from relatively wide bases to pointed tips, the conical pillars comprising outer surfaces that are covered with a plurality of nanoparticles.

18 Claims, 13 Drawing Sheets

(56) References Cited

U.S. PATENT DOCUMENTS

| | | |
|---|---|---|
| 2018/0178571 A1 | 6/2018 | Zhu et al. |
| 2020/0149145 A1 | 5/2020 | Allain et al. |
| 2022/0161365 A1 | 5/2022 | Tsubaki et al. |

OTHER PUBLICATIONS

Bieber, Jay A., et al., "Applications of Electron Beam Induced Deposition in Nanofabrication", Proceedings of the 7th International Caribbean Conference on Devices, Circuits and Systems, Mexico, 2008, pp. 1-6, doi: 10.1109/ICCDCS.2008.4542649.

Bieber, Jay A., et al., "Synthesis of Nanoscale Structures in Single Crystal Silicon Carbide by Electron Beam Lithography", Proceedings of the Fifth IEEE International Caracas Conference on Devices, Circuits and Systems, Dominican Republic, 2004, pp. 158-163.

Broers, A.N., et al., "Electron-beam fabrication of 80-A metal structures", Applied Physics Letters, 1976, pp. 596-598, vol. 29, No. 9, doi: 10.1063/1.89155.

Dellwo, R., "microCMA Compact Auger Analyzer", RBD Instruments, https://rbdinstruments.com/products/microcma.html (last accessed Feb. 21, 2019.

Duparc, O. H., "Pierre Auger—Lise Meitner: Comparative contributions to the Auger effect", International Journal of Materials Research, 2009, pp. 1162-1166, vol. 100, No. 9, doi: 10.3139/146.110163.

Evans, C., "Auger Electron Spectroscopy (AES, Auger)" "EAG Laboratories, https://www.eag.com/ . . . y/auger-electron-spectroscopy/?gclid=EAlalQobChMI2ffd2K7N4AIVrv_jBx3V6wPOEAMYASAAEgKU5vD_BwE (last accessed Feb. 21, 2019)."

Evans, C., "Auger Tutorial: Theory", EAG Laboratories, https://www.eag.com/resources/tutorials/auger-tutorial-theory/ (last accessed Feb. 21, 2019).

Fowler, R.H., F.R.S., and Dr. L. Nordheim, "Electron Emission in Intense Electric Fields", Proceedings of the Royal Society, 1928, pp. 173-181, London.

Gomati, M.M. El and T.A. El Bakush, "Sources of Internal Scattering of Electrons in a Cylindrical Mirror Analyser (CMA)", Surface and Interface Analysis, 1996, pp. 152-162, vol. 24, No. 3.

Hochella Jr, M.F. and A.H. Carim, "A Reassessment of Electron Escape Depths in Silicon and Thermally Grown Silicon Dioxide Thin Films", Surface Science, 1988, L260-L268, vol. 197, No. 3, Elsevier Science Publishers B.V.,doi: 10.1016/0039-6028(88)90625-5.

Hochella, et al. "Scanning Auger Microscopy as a High-Resolution Microprobe for Geologic Materials" American Mineralogist, vol. 71, pp. 1247-1258, 1986.

Koops, H. W. P., et al., "High-resolution electron-beam induced deposition", Journal of Vacuum Science & Technology B: Microelectronics Processing and Phenomena, 1988, pp. 477-481, vol. 6, No. 1, doi: 10.1116/1.584045.

Kuo, Winson C.H., et al., "Characterisation of Catalysts Using Secondary and Backscattered Electron In-lens Detectors", Platinum Metals Review, 2014, pp. 106-110, vol. 58, No. 2, doi: 10.1595/147106714X680113.

Langmuir, Irving, "The Arrangement of Electrons in Atoms and Molecules."", American ChemicalSociety, 1919, pp. 868-934, vol. 41, No. 6, doi: 10.1021/ja02227a002.".

Mosher, Dave, "Nuclear electromagnetic pulse: How it works and when to worry about it", Business Insider, 2017, pp. 1-8, https://www.businessinsider.com/nukes-electromagnetic-pulse-electronics-2017-5 (last accessed Feb. 19, 2019.

Palmberg, P.W., "A combined ESCA and Auger spectrometer", Journal of Vacuum Science and Technology, 1975, pp. 379-384, vol. 12, No. 1, doi: 10.1116/1.568796.

Postek, Michael T., et al., "Comparison of Electron Imaging Modes for Dimensional Measurements in the Scanning Electron Microscope+", Mircoscopy and Microanalysis, 2016, pp. 768-777, vol. 22, doi: 10.1017/S1431927616011430.

Rojas-Nastrucci, Eduardo A., "High Performance Digitally Manufactured Microwave and Millimeter-Wave Circuits and Antennas", University of South Florida, Tampa, 2017, pp. i-94.

Roy, D and D Tremblay, "Design of electron spectrometers", Reports on Progress in Physics, 1990, pp. 1621-1674, vol. 53, IOP Publishing Ltd, Printed in the UK, doi: 10.1088/0034-4885/53/12/003/meta.

Save, D., et al., "Electromigration resistance of copper interconnects", Microelectronic Engineering, 1997, pp. 75-84, vol. 33, doi: 10.1016/S0167-9317(96)00033-0.

Savitzky, Abraham and Marcel J.E. Golay, "Smoothing and Differentiation of Data by Simplified Least Squares Procedures", Analytical Chemistry, 1964, pp. 1627-1639, vol. 36, No. 8, doi: 10.1021/ac60214a047.

"Secondary electron emission", Physics and Radio Electronics, http://www.physics-and-radio-electronics.com/electronic-devices-and-circuits/electron-emission/secondaryelectronemission.html (last accessed Feb. 19, 2019).

Ueda, Yoshihiro, et al., "Quantum dynamics of secondary electron emission from nanographene", Physical Review B, 2016, pp. 035403-1 to 035403-5, vol. 94, doi: 10.1103/PhysRevB.94.035403.

Uritsky, Y., et al., Root cause determination of particle contamination in the tungsten etch back process, Journal of Vacuum Science and Technology A, 1997, pp. 1319-1327, vol. 15, No. 3, American Vacuum Society, doi: 10.1116/1.580583.

"Auger Electron Spectroscopy", Physical Electronics, http://www.phi.com/surface-analysis-techniques/aes.html (last accessed Feb. 21, 2019.

"Mechanism for the Absorption of Light", pp. 1-5, https://www.asu.edu./courses/phs208/patternsbb/PiN/rdg/mechanism/index.html (last accessed Feb. 19, 2019).

* cited by examiner

ULTRAHIGH SURFACE AREA MATERIALS AND METHODS OF MAKING THE SAME

CROSS-REFERENCE TO RELATED APPLICATION

This application is a continuation from U.S. patent application Ser. No. 16/175,736 filed on Oct. 30, 2018, which claims priority to the U.S. Provisional Patent Application No. 62/578,881 filed on Oct. 30, 2017. The disclosure of each of the above-identified patent applications is incorporated herein by reference.

BACKGROUND

Electron spectroscopy is an analytical technique that is used to study electronic structure and its dynamics in atoms and molecules. Generally speaking, an excitation source ejects electrons from an inner-shell orbital of atoms of a material. Detecting photoelectrons that are ejected by x-rays is called x-ray photoelectron spectroscopy (XPS) or electron spectroscopy for chemical analysis (ESCA). Detecting electrons that are ejected from higher orbitals to conserve energy during electron transitions is called Auger electron spectroscopy (AES).

In any type of spectroscopy, noise in the spectrum diminishes the sensitivity of the spectrometer. This becomes a problem when high sensitivity is needed, such as when trying to identify elements at a trace level in the sample. One significant source of noise in electron spectroscopy is scattering of secondary electrons on the inside surfaces of the spectrometer. While various attempts have been made to create surfaces that suppress secondary electron scattering, such as the formation of saw-tooth grooves and deposition of silicon thin films, none have met with great success. It therefore can be appreciated that it would be desirable to have materials that incorporate surfaces that effectively suppress electron scattering.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As mentioned above, it would be desirable to have materials that comprise surfaces that effectively suppress electron scattering. Disclosed herein are examples of such materials and surfaces. In some embodiments, a surface of a material is laser-beam machined so as to comprise an array of micro-sized conical pillars that extend upward from the surface of the material. In some embodiments, the conical pillars are covered with nanoparticles. Together, the size and shape of the conical pillars and the presence of the nanoparticles greatly increase the surface area of the material's surface, which enables the surface to absorb electrons and thereby suppress electron scattering. Notably, the laser-beam machined surfaces can be used in applications beyond electron absorption. For example, the laser-beam machined surfaces can, in some embodiments, be used to absorb electromagnetic radiation. In such cases, the surfaces can be used in a variety of other applications, such as light-absorption and stealth applications.

In the following disclosure, various specific embodiments are described. It is to be understood that those embodiments are example implementations of the disclosed inventions and that alternative embodiments are possible. All such embodiments are intended to fall within the scope of this disclosure.

Disclosed herein are ultrahigh surface area materials that are formed using laser-beam machining. Such materials were first developed by the inventor while seeking a means to absorb electrons to minimize secondary electron scattering in electron spectroscopy applications. During experimentation, the surface of oxygen-free high-temperature copper (OFHC) was machined using a 30 MegaWatt peak power pulsed neodymium vanadate laser (Nd—YVO$_4$). The laser had a 5× lens with a spot size of 16 The laser had an infrared wavelength of 1064 nm, a pulse width of 15 picoseconds, and a pulse repetition rate of up to 100 kHz. The average power of the laser can be adjusted to be as high as 10 W. The laser was set to 3 W with a linear scan speed of 50 mm/s, which was considered optimal. In the experiment, a 2¾ in. diameter, 1 mm thick OFHC gasket shown in FIG. 1 was used as a substrate to simulate the inner surface of an outer cylinder used in a cylindrical mirror analyzer (CMA).

Figure 1:
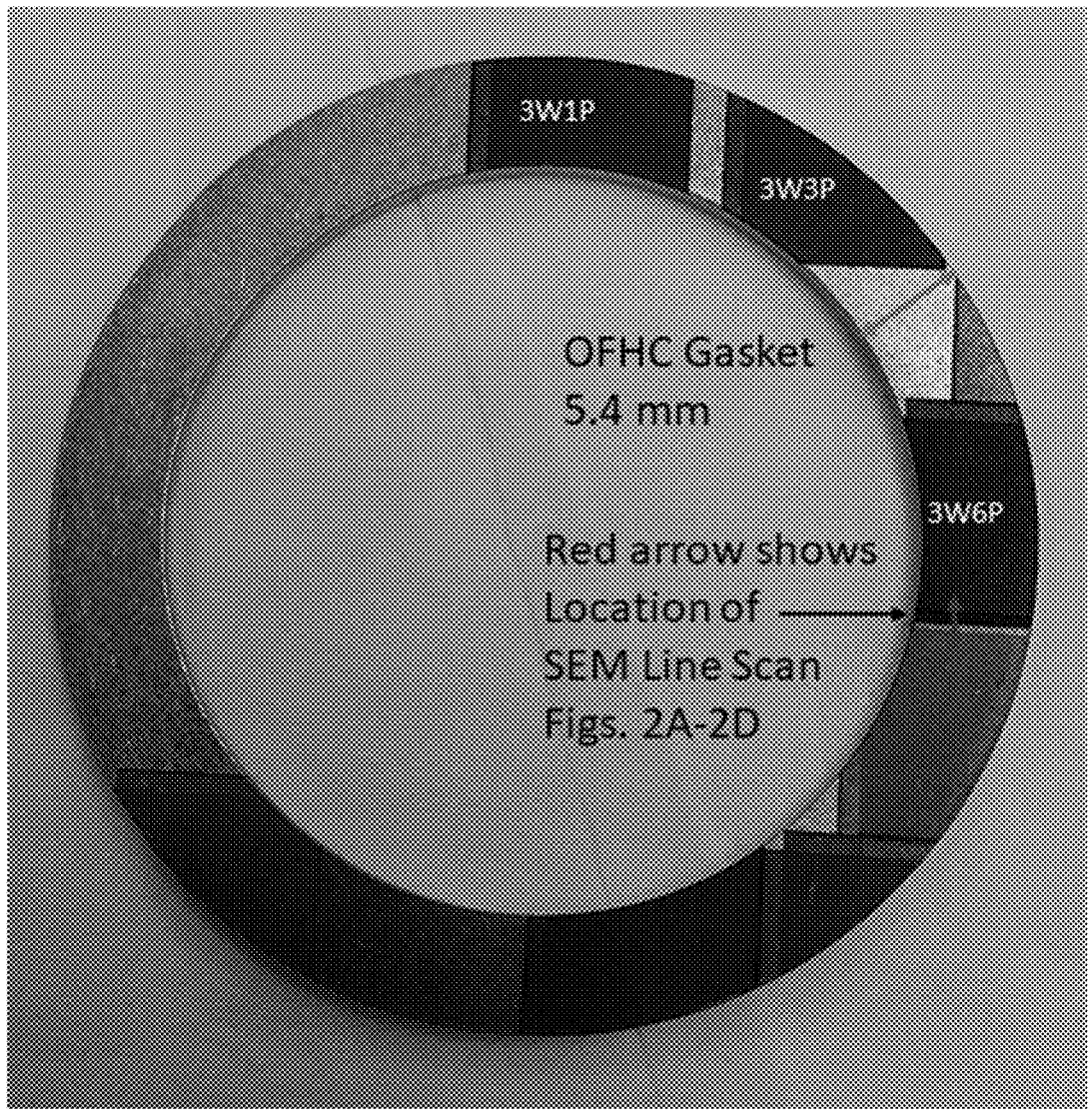
FIG. 1 is an image of a copper gasket that was laser-beam machined in several discrete areas. These areas are relatively dark in the image.

The laser system was used to machine an orthogonal array of micro-sized conical pillars (micropillars) having deep troughs formed between them that act as Faraday cups configured to absorb secondary electrons. To produce the array, the scanning stage of an nScript 3D laser printer was programmed to scan the surface of the OFHC gasket along orthogonally arranged rows and columns to create an orthogonal grid pattern. The lines in both the rows and the columns were spaced from each other by 50 µm, forming a grid with 50×50 µm spacing. Experiments were performed to determine the laser power needed to cut deep grooves in the gasket. Three different power settings were used: 0.5, 1.5, and 3 W. It was determined that 3 W was needed to form grooves in the OFHC material, which caused dark patches to appear in the copper, as shown in FIG. 1. In that figure, three laser-beam machined areas are labeled, 3w1p, 3w3p, and 3w6p. Each of these areas was formed using 3 W of power, and with 1, 3, and 6 repeated passes of the 50×50 µm crosshatch pattern. Accidental overlapping of two adjacent laser-beam machined areas formed a dark line, which is identified in FIG. 1. These results indicate that greater laser power was needed to form deep grooves in the OFHC material and produce secondary electron-absorbing structures. As shown in FIG. 1, the 3w6p area appeared darker, as expected, because deeper grooves were formed in that area.

Figure 2A:
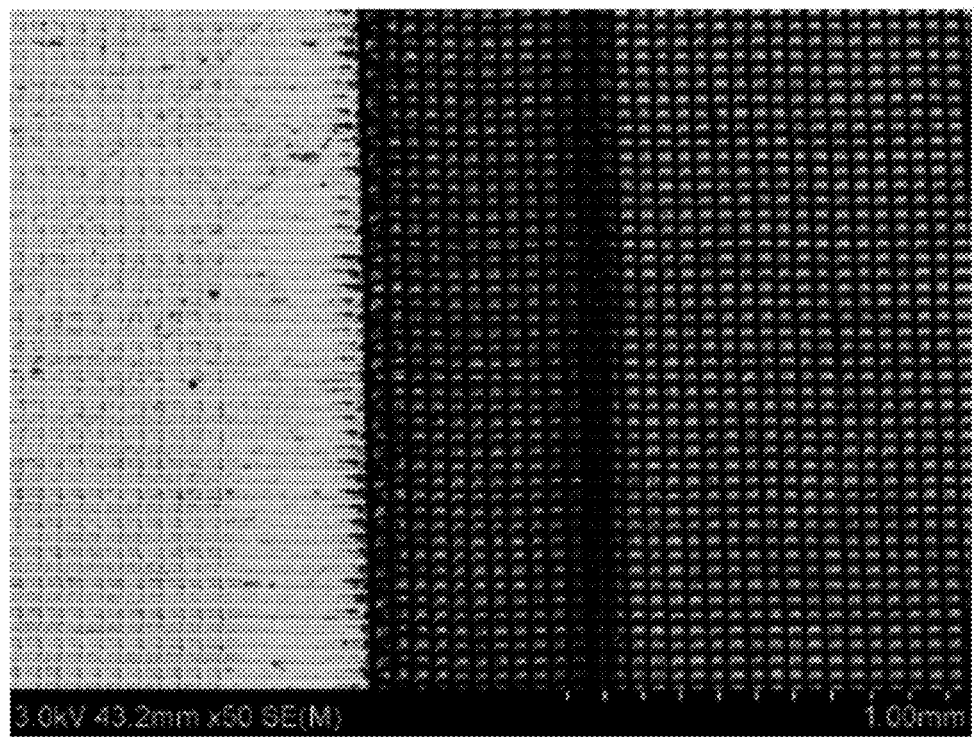
FIGS. 2A, 2B, 2C, and 2D are scanning electron microscope (SEM) images of a laser-beam machined area of the copper gasket of FIG. 1 shown at 50×, 76×, 400×, and 800× magnification, respectively. A secondary electron emission waveform is overlaid in FIG. 2B to illustrate secondary electron absorption of the laser-beam machined area.
Figure 2B:
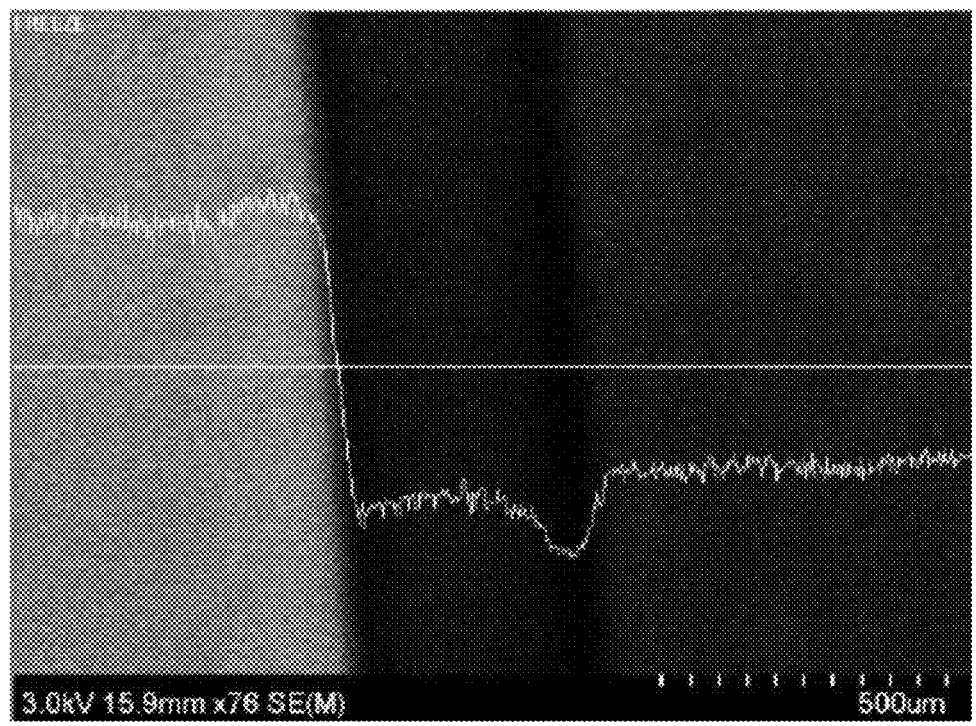
Figure 2C:
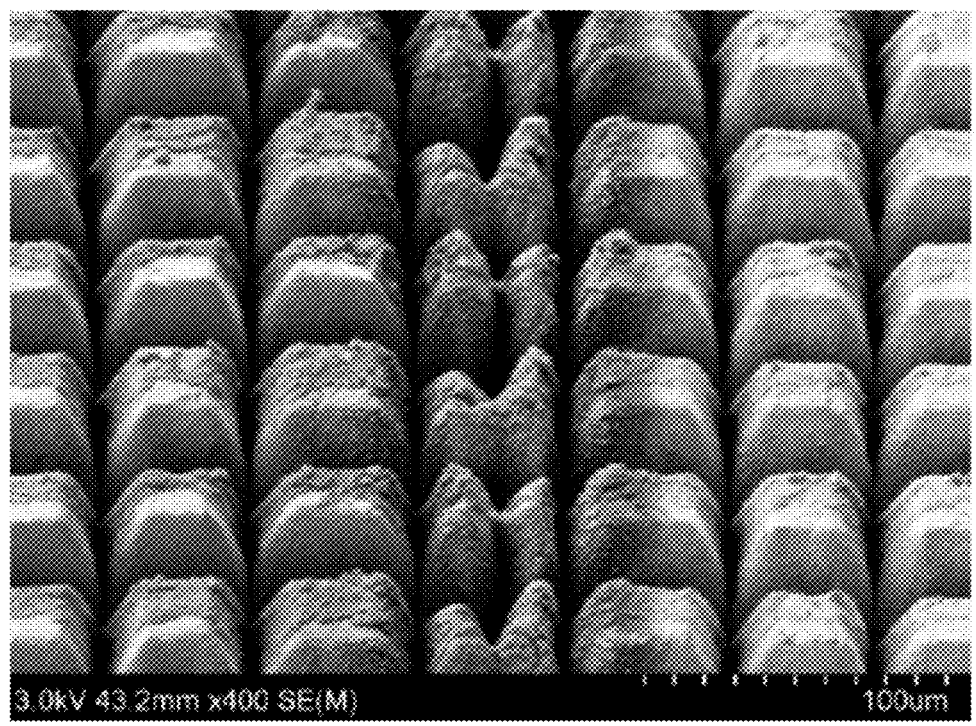
Figure 2D:
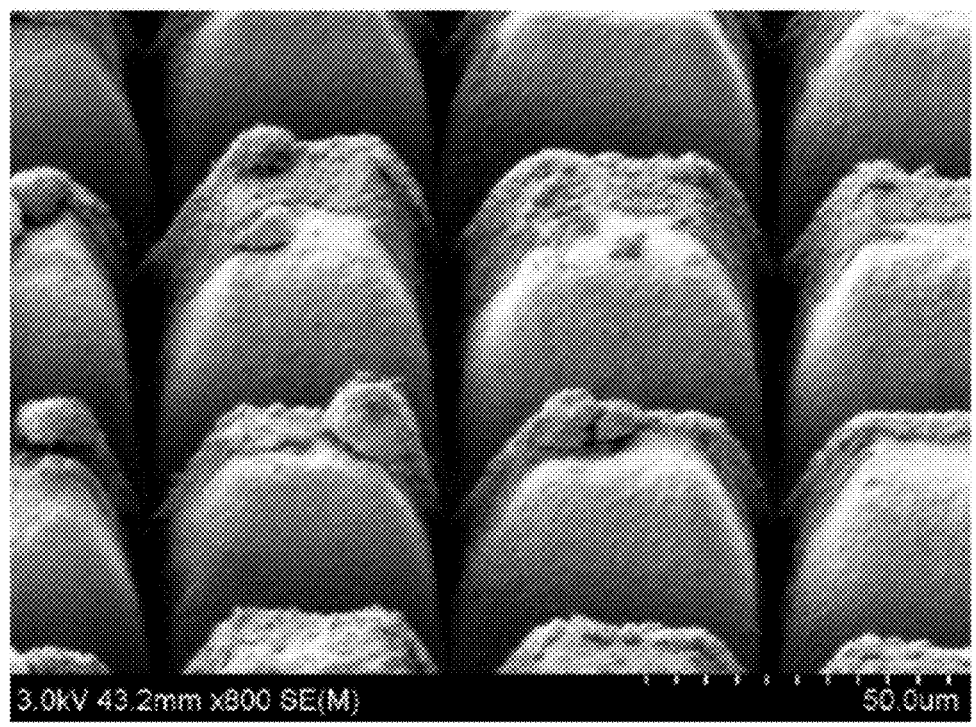

FIGS. 2A-2D are scanning electron microscopy (SEM) images of the dark patch shown in FIG. 1. FIG. 2A shows the dark overlapping area at 50× magnification. FIG. 2B shows the overlapping area at 76× magnification and includes an overlying secondary electron emission waveform obtained using a beam energy of 3 keV. As can be appreciated from FIG. 2B, there was a large decrease in secondary electron emission in the dark overlapping area. FIGS. 2C and 2D are 400× and 800× magnification images, respectively, of the overlapping area and reveal micro-sized, flat-topped pyramids that resulted from the laser-beam machining.

Figure 3:
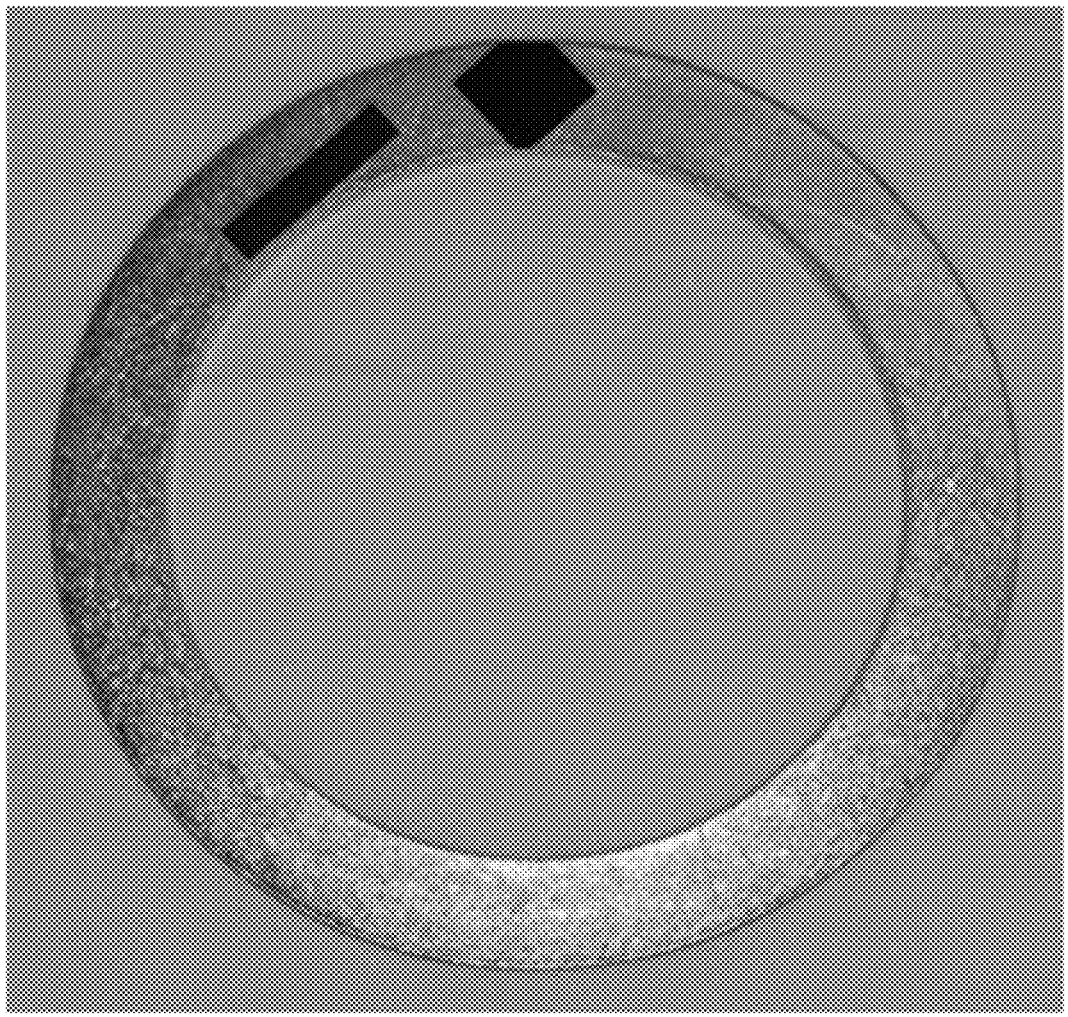
FIG. 3 is an image of a further copper gasket that was laser-beam machined in two discrete areas. These areas are relatively dark in the image.

In a later experiment, a further OFHC gasket, shown in FIG. 3, was laser-beam machined using a line spacing of 25×25 µm. The laser power was set to 3 W and 6 repeated passes were performed to form a 10×10 mm laser-beam machined area. This area is visible at the 12 o'clock position on the gasket in FIG. 3. The 25×25 µm laser scan spacing produced a high-density array of micro-sized conical pillars (micropillars). In this example, the conical pillars had an area density of $1.6 \times 10^5$ per square centimeter. Because of the troughs formed between the conical pillars, electrons that strike the array have a low probability of escape. Accordingly, the array functions as an electron suppressor. In addition, given that the array is dark in color, it further absorbs light, as well as other forms of electromagnetic radiation. Specifically, light that enters the troughs between the conical pillars undergo multiple scattering that limits the amount of light that can escape the array.

Figure 4A:
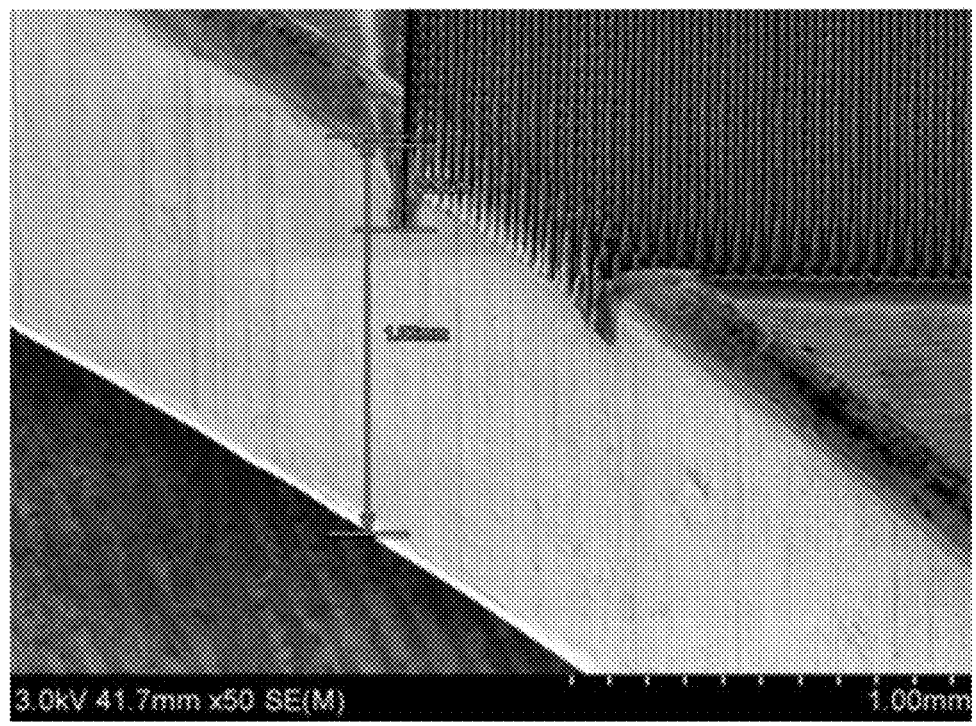
FIGS. 4A, 4B, 4C, and 4D are SEM images of a laser-beam machined area of the copper gasket of FIG. 3 (at the 12 o'clock position) shown at 50×, 200×, 250×, and 10,000× magnification, respectively.
Figure 4B:
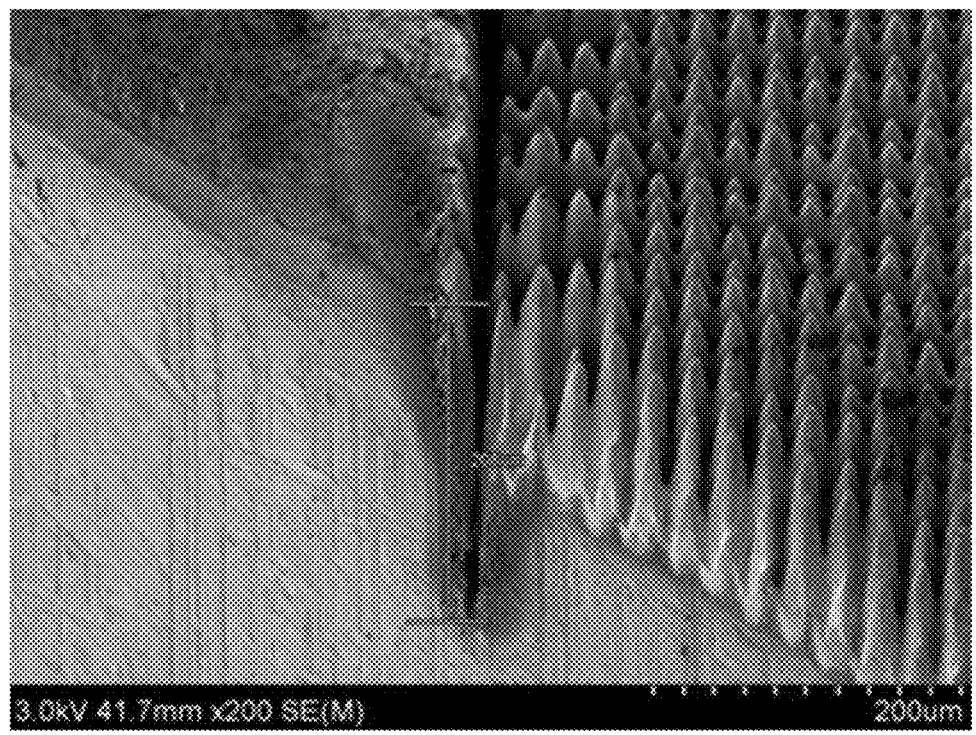
Figure 4C:
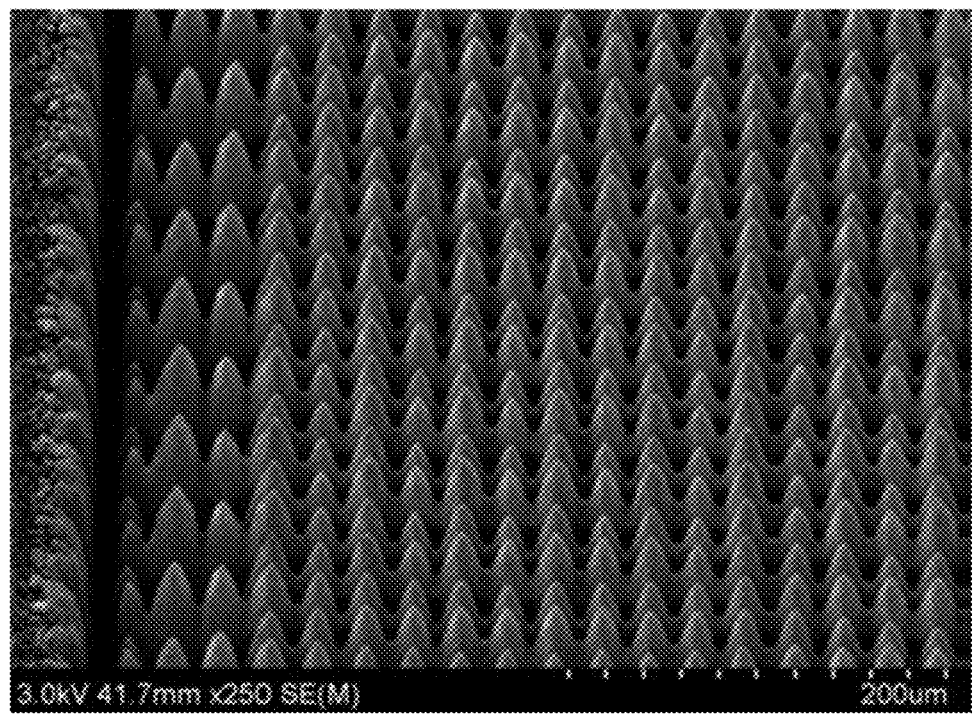
Figure 4D:
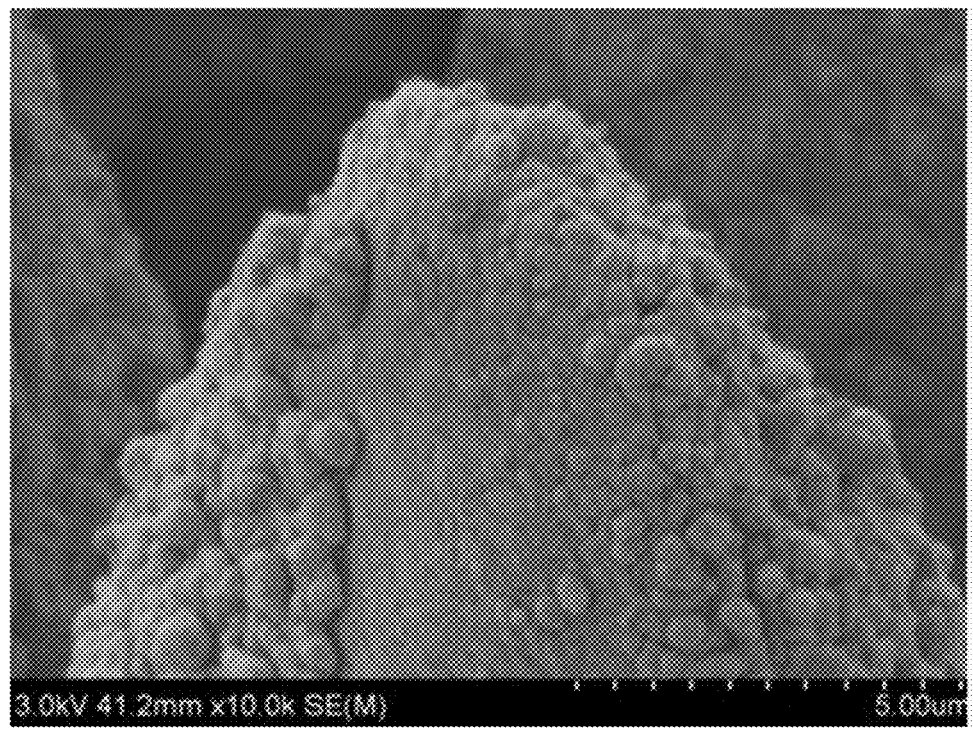

FIG. 4A is a SEM image at 50× magnification of an inside edge of the laser-beam machined area formed on the OFHC gasket. This edge is visible as the bottom corner of the black rectangle located at the 12 o'clock position on the gasket in FIG. 3. At this location, the corner of the 10×10 mm scan area extended beyond the inside edge of the gasket. As is apparent in FIG. 4A, the laser-beam machined area is comprised of a high-density array of micro-sized conical pillars. The SEM image in FIG. 4B shows a portion of this area at 200× magnification. In this example, the majority of the conical pillars of the laser-beam machined area were approximately 100 µm tall. As a consequence, the troughs between the conical pillars were approximately 100 µm deep. As is visible in FIG. 4B, the conical pillars along the left edge of the area, however, were approximately 200 µm tall. This height difference was due to the increased laser dose the gasket received in that location from the laser stopping at the edge of the area and changing scan direction for each line that was scanned. FIG. 4C shows the conical pillars at 250× magnification and FIG. 4D shows the tip of one of the conical pillars at 10,000× magnification. As can be appreciated from FIG. 4D, each conical pillar has a pointed tip and the outer surface of the pillars are covered with a plurality of nanoparticles, such as nanospheres, that range in size (e.g., diameter) from approximately 1 nm to 1 µm. Significantly, these nanoparticles are not deposited or otherwise added to the conical pillars. Instead, the nanoparticles form as a natural consequence of the laser-beam machining. Due to the 25 µm line spacing, the bases of the pillars had width dimensions (e.g., diameters) of approximately 25 µm. The pointed tips of the conical pillars were approximately 1 to 2 microns in radius.

Figure 5A:
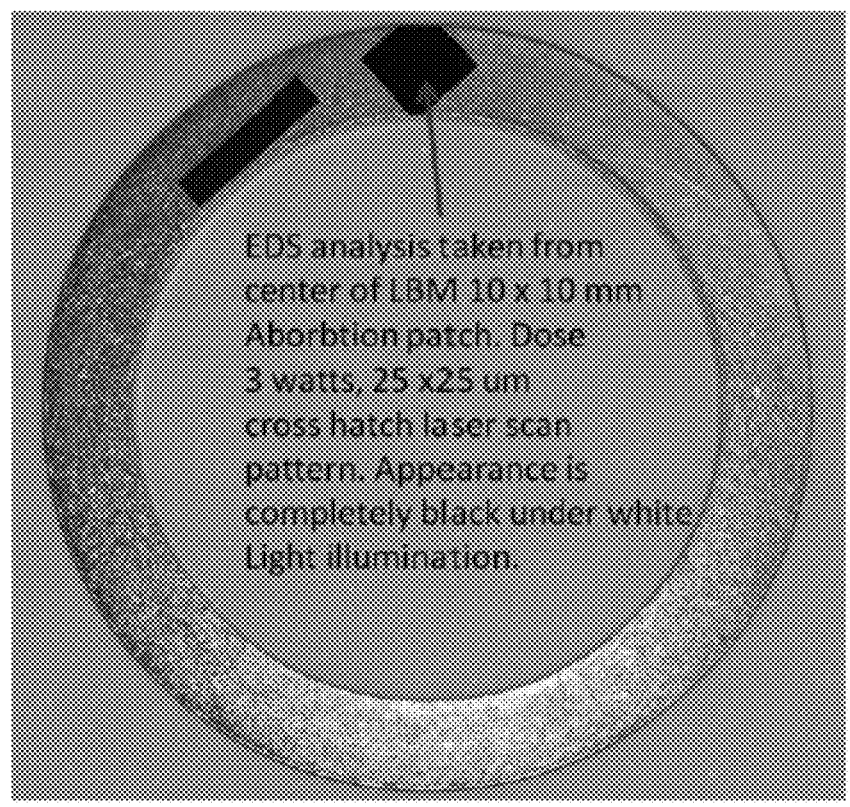
FIG. 5A is the image of the copper gasket of FIG. 3 labeled to identify a location at which energy dispersive spectroscopy (EDS) was performed.
Figure 5B:
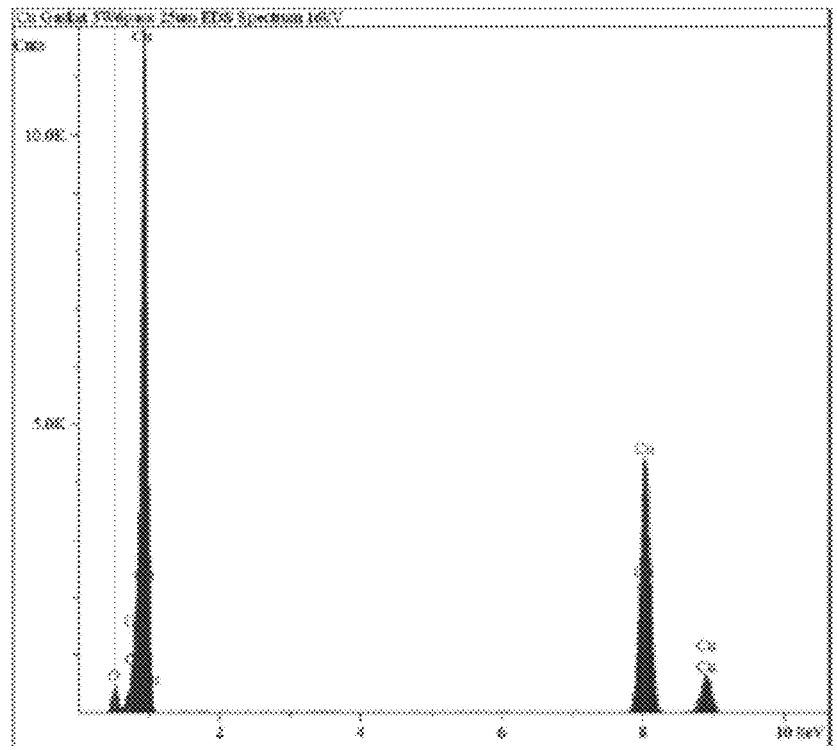
FIG. 5B is a graph that shows the spectrum that was obtained during the EDS identified in FIG. 5A.

Energy dispersive spectroscopy (EDS) was performed in the center of the 10×10 mm laser-beam machined area, as identified in FIG. 5A. Table 1 comprises the results of the quantitative elemental EDS analysis and shows the laser-beam machined area to be 98% copper with 2% oxygen.

TABLE 1

SEM EDS Quantitative Elemental Analysis of Laser-Beam Machined Array

| Element | Line | Intensity (c/s) | Error 2-sig | Low keV | High keV | Atomic % | Conc. | Units |
|---|---|---|---|---|---|---|---|---|
| Oxygen | Kα | 82.02 | 2.574 | 0.471 | 0.579 | 7.545 | 2.013 | wt % |
| Copper | Kα | 1306.40 | 9613 | 7.949 | 8.147 | 92.455 | 97.987 | wt % |
| | | | | | | 100.00 | 100.00 | wt % Total |
| kV 16 | Tilt 30° | TOA 60° | LT 60s | | | | | |
| | | | | | | | 98% | Copper Total |

Figure 6A:
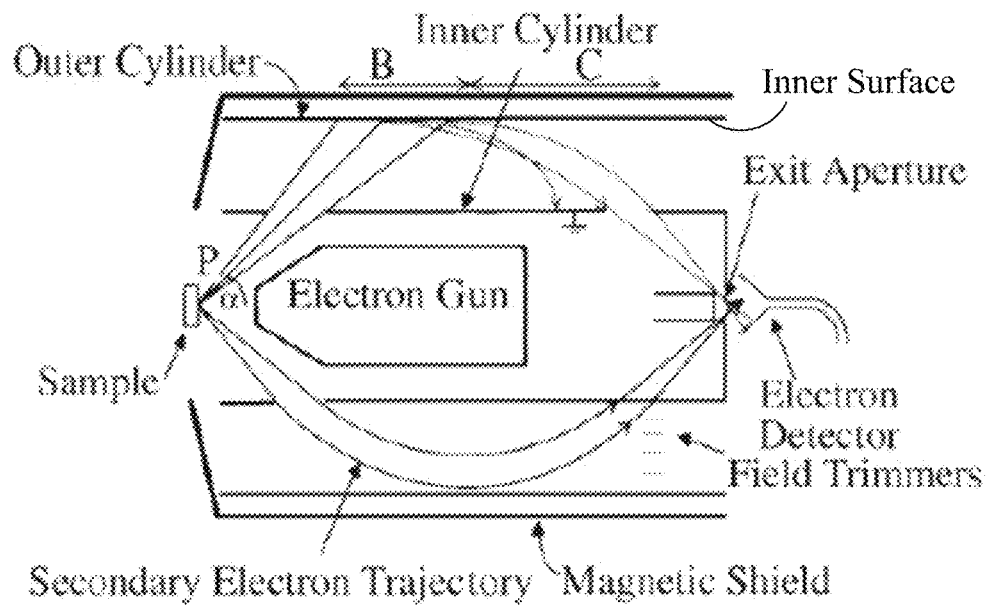
FIGS. 6A and 6B are schematic views of components of a cylindrical mirror analyzer (CMA) of an electron spectrometer, including an outer cylinder whose inner surface can be provided with a laser-beam machined array of micro-sized conical pillars.
Figure 6B:
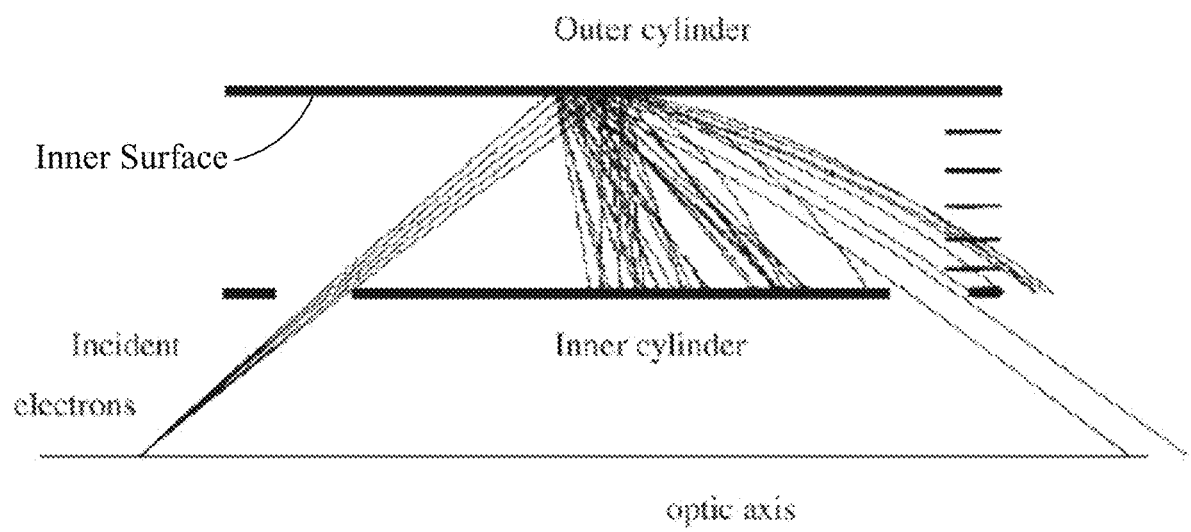

Experiments were also performed to test the ability of an outer cylinder of a CMA of an electron spectrometer in suppressing secondary electron scattering. FIGS. 6A and 6B illustrate an example of such an outer cylinder as used in an electron spectrometer. As shown in these figures, the outer cylinder comprises an inner surface that electrons from a sample strike during operation of the equipment. It is this surface that can be laser-beam machined to form an array of micro-sized conical pillars that suppress secondary electron scattering. In order to simulate electrons striking the inside surface of an outer cylinder of a CMA, an OFHC substrate was mounted in a scanning electron microscope tilted at 42.3 degrees to approximate the angle of attack of the electrons striking the inside of the outer cylinder.

Figure 7A:
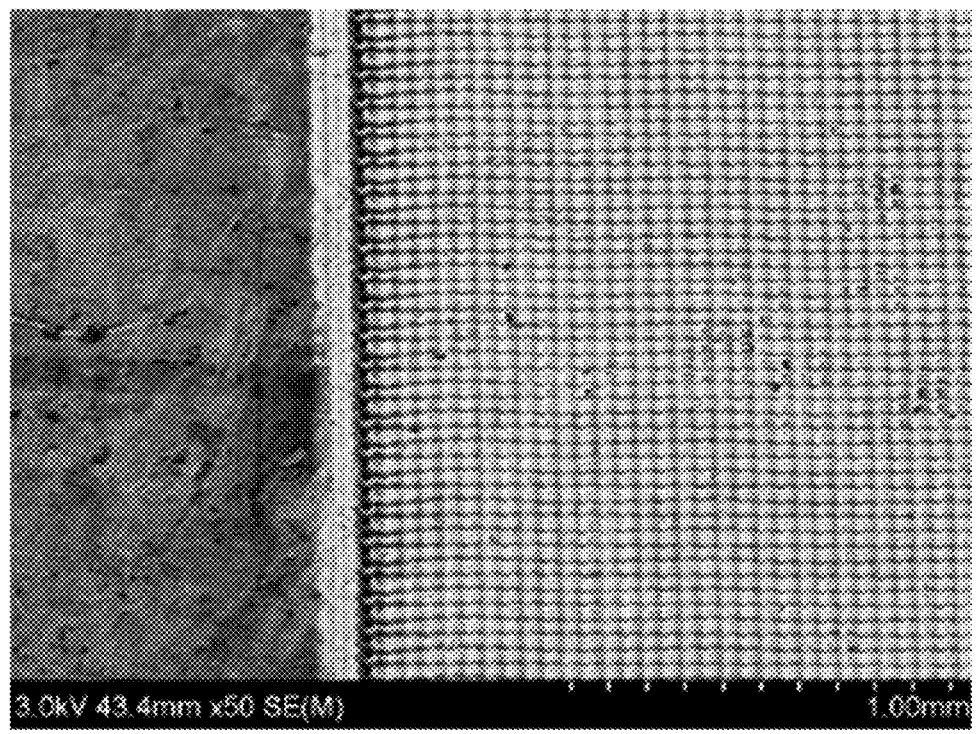
FIGS. 7A, 7B, 7C, and 7D are SEM images of an interface between a non-machined area and a laser-beam machined area of the copper gasket of FIG. 3 shown at 50×, 50×, 50×, and 70× magnification, respectively. A secondary electron emission waveform is overlaid in FIGS. 7B and 7D to illustrate secondary electron absorption of the laser-beam machined area.
Figure 7B:
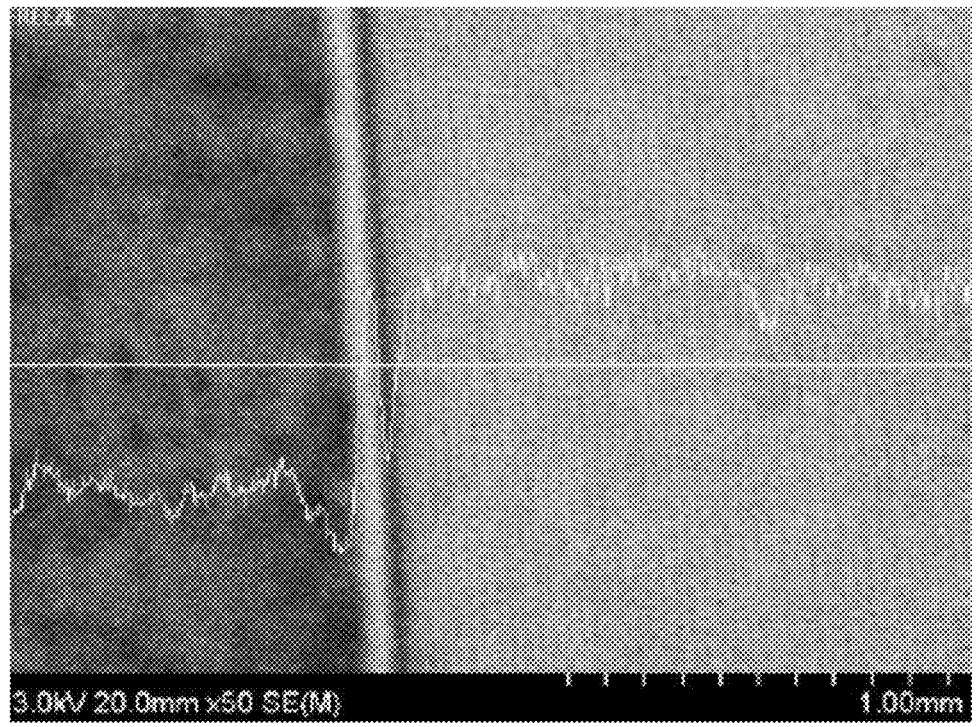
Figure 7C:
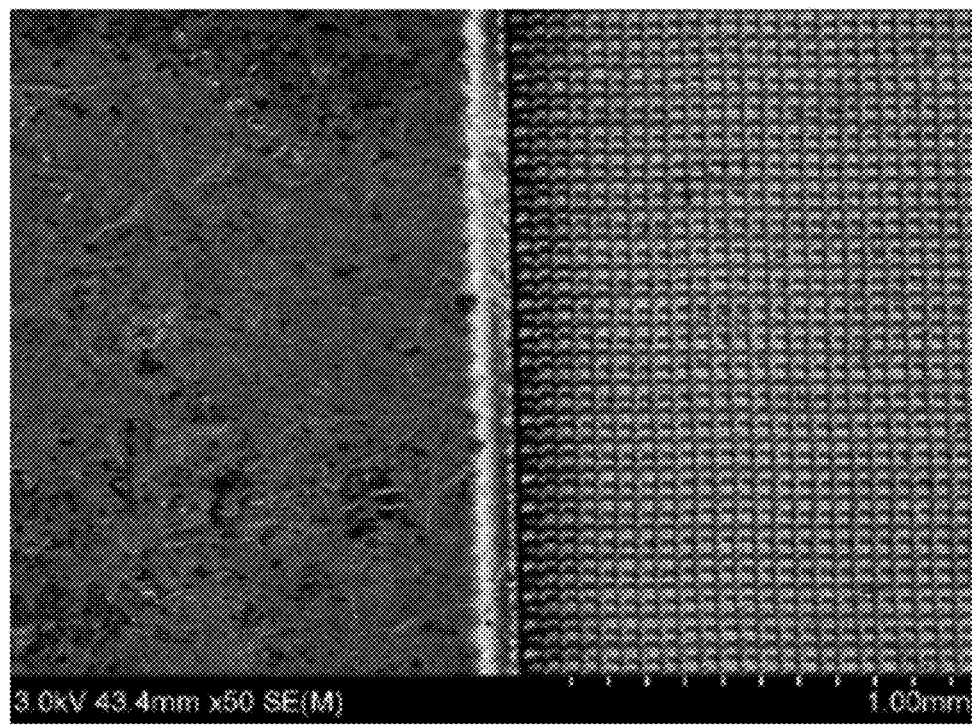
Figure 7D:
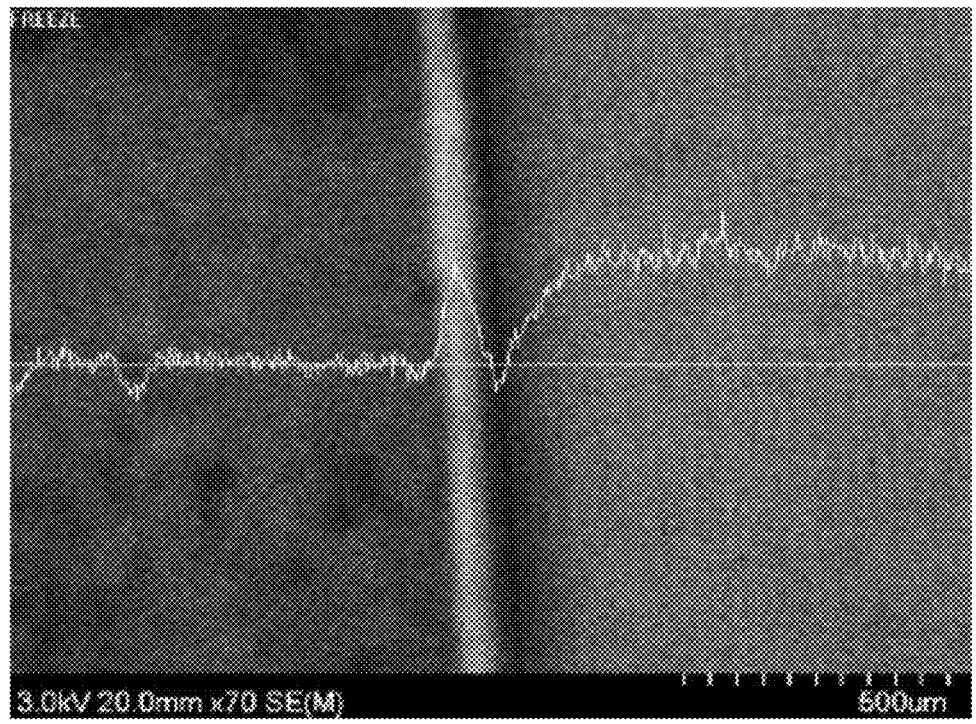
Figure 8A:
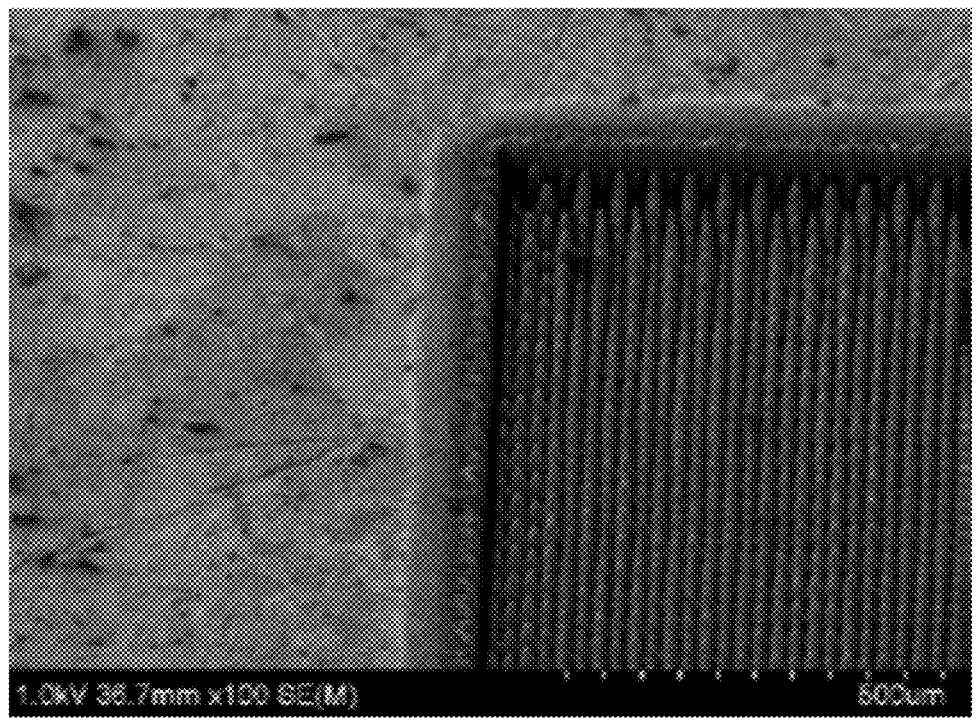
FIGS. 8A, 8B, 8C, and 8D are SEM images of a further interface between a non-machined area and a laser-beam machined area of the copper gasket of FIG. 3 shown at 100×, 90×, 92×, and 94× magnification, respectively. A secondary electron emission waveform is overlaid in FIGS. 8B-8D to illustrate secondary electron absorption of the laser-beam machined area. These figures were defocused in order to obtain a better average along the line scan of the secondary electron emission.
Figure 8B:
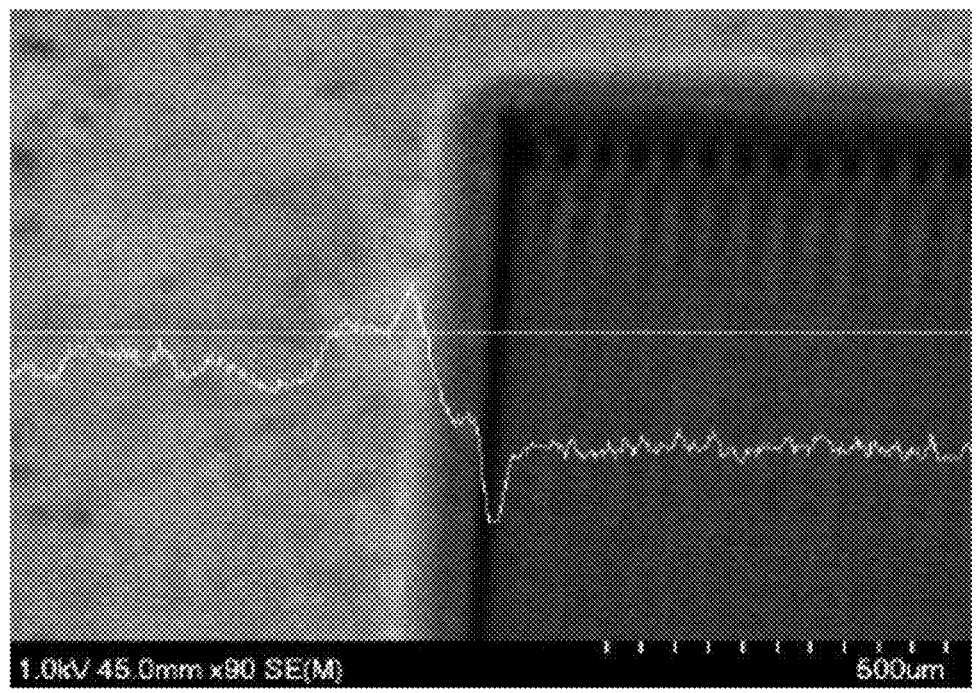
Figure 8C:
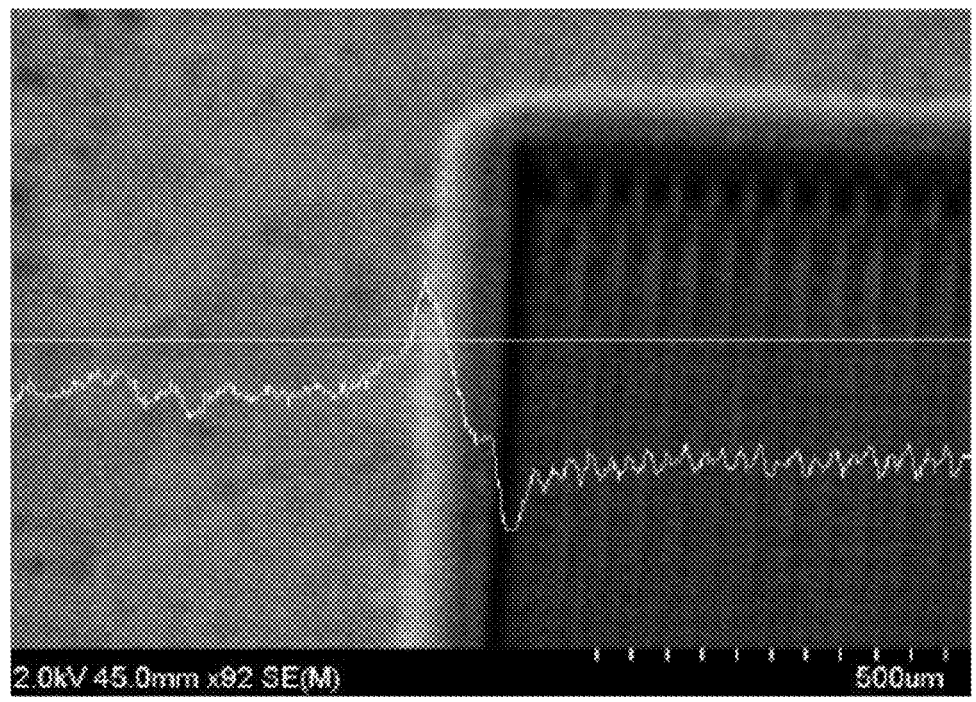
Figure 8D:
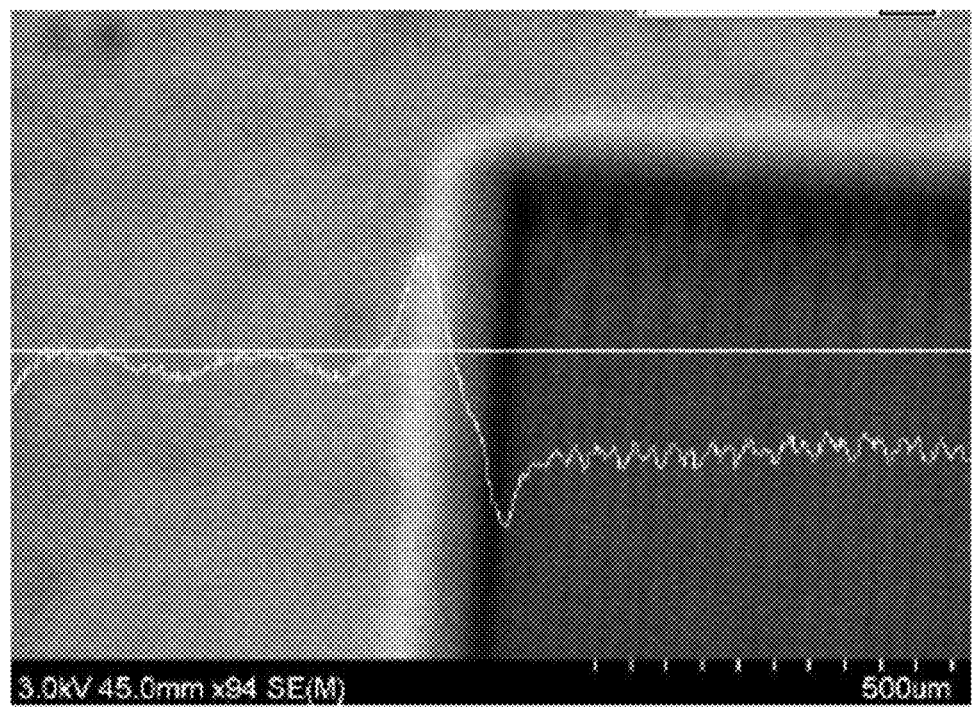

A focused electron beam was first used to find the area of interest and collect a SEM image. Next, the beam was purposely defocused to simulate diffuse low-current electrons as would be the case for electrons striking the outer cylinder. FIG. 7A shows a focused SEM image of a corner of the dark rectangle shown in FIG. 3. As can be observed in FIG. 7A, the laser-beam machining produced a large number of flat-topped conical pillars in the OFHC with deep grooves or troughs between them. The deep grooves/troughs act to absorb electrons while the flat tops enhance electron emission. In FIGS. 7B-7D, SEM images were captured after the laser beam was defocused to the point where the conical pillars could no longer be resolved by the electron beam. This indicates that the beam diameter was larger than the conical pillars and thus the effect is averaged over several pillars. The laser dose in FIGS. 7A and 7B was 3 W with one pass of the laser. The electron line scan waveform starts on the left showing a large increase in baseline electron emission as the electron beam moves onto the laser-beam machined area. The laser dose in FIGS. 7C and 7D was 3 W with three repeated passes of the 50×50 µm crosshatch. This produced deeper grooves and increased electron absorption, as shown in the waveform in FIG. 7D. It is important to note the brightness and contrast gain on the secondary electron defector used to collect these waveform measurements must remain unchanged As seen in FIGS. 7A-7D, increasing the number of passes increased the depth of machined trenches and reshaped the tops of the pillars from flat, which increases electron emission, to a cone-shaped, which absorbs electrons. In FIGS. 8A-8D, the laser beam was set to a power of 3 W and was scanned with six repeated laser passes and a 25×25 µm crosshatch pattern over a 10×10 mm area. A line scan across the OFHC and the conical pillar array interface was performed and the secondary electron output is displayed in FIG. 8 as a waveform superimposed on top of the image. The beam was defocused in order to get a better average along the line scan of the secondary electron emission. This was repeated at three commonly used beam energies used for Auger spectroscopy analysis in the CMA. FIGS. 8B, 8C, and 8D show the secondary electron emission waveforms for 1, 2, and 3 keV electrons, respectively. As can be appreciated from these waveforms, the secondary electron emission was significantly reduced when the electron beam entered the laser-beam machined array. Notably, the secondary electron suppression does not appear to depend on beam energy. For all three energies, the relative secondary electron drop was approximately the same. The lowest secondary electron emission, which produced brightness in these waveforms, occurred at the edge of the conical pillar array. It is at that edge where the laser beam had the longest residence time as it performed the scanning. As noted above, this occurred because the laser scans a short distance to move to the next scan line and this results in the edges receiving larger laser residence times. This creates deeper grooves and troughs, which were approximately 200 µm deep (see FIG. 4). As can be appreciated from the results shown in FIG. 8, at beam energies between 1 and 3 keV (i.e., the range typically used in the CMA), there is little change in the ability of the conical pillar array to suppress secondary electron emission.

In the foregoing discussion, specific embodiments of ultrahigh surface area surface materials have been described that are specifically configured to absorb electrons within electron spectrometers. While the surfaces are well suited for such an application, other applications are possible. For example, laser-beam machined surfaces of the type described herein can be used to absorb electromagnetic radiation, including light waves, microwaves, and radio waves, and one or more parameters of the laser-beam machined array can be tuned for particular applications. As examples, the materials used to form the array can be altered and the physical parameters of the conical pillars of the array can be tuned for particular applications. Through the experiments, it was determined that a high aspect conical shape performed well as an electron absorber. In some applications, such as in an electron detector, it is an advantage to have increased electron emission versus an unmodified surface. FIG. 7D shows a rectangular array of laser-ablated OFHC squares at 50× magnification. The laser beam was then defocused and a line scan was performed to plot the electron emission characteristics. The electron emission waveform overlaid on the secondary electron image in FIG. 7D shows increased emission as the beam moves on to the laser-beam machined area.

Figure 9:
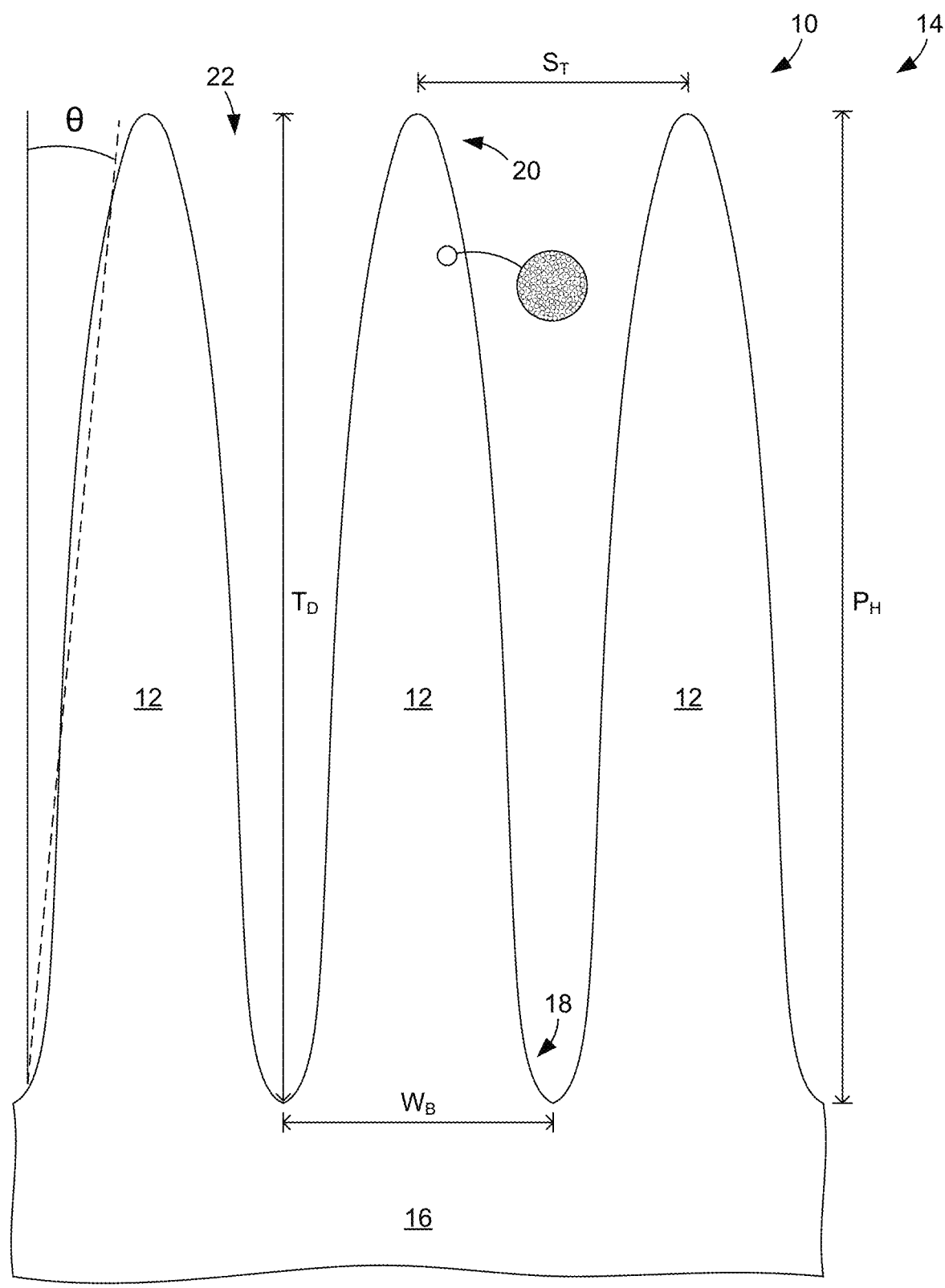
FIG. 9 is a schematic side view of a portion of a laser-beam machined area that comprises a high-density array of micro-sized conical pillars.

The above-described laser-beam machined arrays have many other applications beyond electron absorption. The arrays may be used in substantially any application in which the surface area is to be increased to have an effect on absorption and emission of other types of radiation, for example, as a heat sink, an electromagnetic (EM) radiation sink, or a Faraday cage. The periodicity of the microstructures may also be tuned to the desired wavelength to act as a resonant EM absorber. There will likely also be applications of these microstructures chemical catalytic reactors, and for use as chemical sensors. Coatings applied over these surfaces can have the surface area accurately controlled to tune chemical reaction rates within the range of a process. in some embodiments, the number of pillars in the array is limited by the laser beam diameter FIG. 9 schematically illustrates a portion of a laser-beam machined array 10 of micro-sized conical pillars (micropillars) 12 that form an ultrahigh surface area surface 14 on a substrate 16 that can comprise part of substantially any component or device that is to incorporate an ultrahigh surface area surface. As the array 10 is formed by laser-beam machining the surface 14 of the substrate 16, the substrate and the array of micro-sized conical pillars 12 are made from a single unitary piece of material. In some embodiments, the substrate 16 and the array 10 (including the conical pillars 12) are made of a metal material, whether it be a pure or alloyed metal. As noted above, the substrate 14 can be made of copper, such as OFHC. Other example electrically conductive metals used in electron vacuum tubes and particle accelerators include magnesium, stainless steels, beryllium copper, aluminum, brass, gold, platinum, palladium, iridium, and tungsten. In other embodiments, the substrate 14 can be made of non-metal material, such as a polymeric or ceramic material. In some embodiments, the surface area of a polymer paint or coating may be tuned by laser printing a pattern such as that described above to enhance heat exchange or for purposes of chemical activity, for example in the case of a catalyst or chemical sensor. Other example substrate materials and or coatings may include refractory ceramics and plasma coatings such as aluminum oxide, magnesium oxide, and zirconia.

As depicted in FIG. 9, each conical pillar 12 is generally conical in shape and, therefore, each has a relatively wide base 18 and gradually tapers as the pillar is traversed upward from the base to a pointed tip 20. While the tips 20 are "pointed," as can be appreciated from images such as that of FIG. 4C, it is noted that the tips can further be slightly rounded, at least when viewed at a highly magnified scale, as depicted in FIG. 9. In some embodiments, each tip 18 can have a radius of curvature of approximately 0.5 to 50 μm. As further shown in FIG. 9, the conical pillars 12 can taper from base 18 to tip 20 at an angle θ of approximately 1 to 20°. The bases 18 can have a width dimension WB (e.g., diameter) that is approximately 1 to 50 μm and the tips 20 of adjacent pillars 12 (along any given row or column in the array 10) can be spaced a distance ST that is approximately 5 to 50 μm. Notably, as the conical pillars 12 are each typically vertically aligned, the distance ST typically corresponds to the spacing of the scan lines used during the laser-beam machining.

The height dimension of the conical pillars 12, $P_H$, can range from approximately 0.1 μm to 500 μm, such as 50 to 150 μm, and the troughs 20 formed between adjacent pillars can have similar depth dimensions $T_D$. As noted above, the conical pillars 12 can include a plurality of nanoparticles 22, which greatly increases the surface area of the pillars 12 and the array 10. As was also noted above, these nanoparticles 22 can range in size (e.g., diameter) from approximately 1 nm to 1 μm. The array 10 can have a high pillar density such that there are numerous conical pillars 12 per unit area. In some embodiments, the array has a pillar density of approximately $1.0 \times 10^4$ to $1.0 \times 10^8$ pillars per square centimeter.

In addition to the parameters of the laser-beam machined array and its conical pillars, the parameters of the laser-beam machining process can be altered depending upon the application. In some embodiments, an array can be formed by scanning a laser beam having a spot size of approximately 1 to 20 μm and a wavelength of approximately 0.25 to 10 μm across the surface of material that is to be provided with an ultrahigh surface area. The laser can be operated at an average power of 1 to 10 W with a pulse width of 0.01 to 100 picoseconds and a repetition rate of approximately 0.1 to 500 MHz. The laser beam can be scanned across the surface at scan speed of approximately 1 to 100 mm/s with a scan line spacing of approximately 5 to 50 μm. Each line can be scanned with 1 to 10 passes to achieve the desired machining depth.

What is claimed is:

1. An article of manufacture comprising:
   a substrate having first and second surfaces;
   a surface relief configured as a grid pattern of rows and columns on the first surface, wherein said grid pattern includes an array of micro-sized conical pillars extending from the first surface and troughs defined between said pillars, and
   pluralities of nanoparticles located on said conical pillars.

2. An article of manufacture according to claim 1, wherein said substrate is dimensioned as a first cylinder.

3. An article of manufacture according to claim 2, further comprising a second cylinder substantially co-axial with the first cylinder.

4. An article of manufacture according to claim 1, wherein the article is configured as an electron spectrometer.

5. An article of manufacture according to claim 1, wherein said conical pillars are tapered from corresponding bases at the first surface towards pointed tips thereof.

6. An article of manufacture according to claim 5, wherein a taper angle of a conical pillar from said array is within a range from approximately 1 degree to approximately 20 degrees.

7. An article of manufacture according to claim 5, wherein the pointed tips are rounded.

8. An article of manufacture according to claim 1, wherein the grid pattern is configured as a Faraday cage.

9. An article of manufacture according to claim 1, wherein the troughs are configured as Faraday cups.

10. An article of manufacture according to claim 1, wherein the array has a surface density of micro-sized conical pillars from approximately $1.0 \times 10^4$ pillars per square centimeter to approximately $1.0 \times 10^8$ pillars per square centimeter.

11. An article of manufacture according to claim 1, wherein a base of a micro-sized conical pillar of said array has a width in range from approximately 1 micron to approximately 50 microns.

12. An article of manufacture according to claim 1, wherein the micro-sized conical pillars are spaced from each other along the rows and columns by a distance of 5 microns to 50 microns.

13. An article of manufacture according to claim 1, wherein a micro-sized conical pillar of said array has a height in a range from approximately 10 microns to approximately 500 microns.

14. An article of manufacture according to claim 1, wherein the nanoparticles range in size from approximately 1 nanometer to 1 micron.

15. An article of manufacture according to claim 1, wherein the substrate and the array of micro-sized conical pillars are configured as a single unitary piece of material.

16. An article of manufacture according to claim 15, wherein the material includes metal.

17. An article of manufacture according to claim 15, wherein the material includes a polymeric material.

18. An article of manufacture according to claim 15, wherein the material includes a ceramic material.

* * * * *